(12) United States Patent
Merrill

(10) Patent No.: US 6,697,114 B1
(45) Date of Patent: Feb. 24, 2004

(54) TRIPLE SLOPE PIXEL SENSOR AND ARRY

(75) Inventor: Richard B. Merrill, San Jose, CA (US)

(73) Assignee: Foveon, Inc., Santa Clara, CA (US)

( * ) Notice: Subject to any disclaimer, the term of this patent is extended or adjusted under 35 U.S.C. 154(b) by 0 days.

(21) Appl. No.: 09/374,501

(22) Filed: Aug. 13, 1999

(51) Int. Cl.$^7$ .......................... H04N 3/14; H04N 5/335; H01L 27/148; H01L 29/768

(52) U.S. Cl. ...................... 348/308; 348/263; 348/267; 257/229

(58) Field of Search .................. 257/229; 348/267, 348/263, 308

(56) References Cited

U.S. PATENT DOCUMENTS

| 3,866,067 A | 2/1975 | Amelio |
| 3,934,161 A | 1/1976 | Caywood |

(List continued on next page.)

FOREIGN PATENT DOCUMENTS

| DE | 43 04 506 A1 | 8/1994 | |
| DE | WO 96/15626 | 5/1996 | |
| DE | WO 97/17800 | 5/1997 | |
| DE | WO 98/19455 | 5/1998 | |
| DE | 198 36 356 A1 | 5/1999 | |
| DE | WO 99/66560 | 12/1999 | |
| DE | WO 99/66712 | 12/1999 | |
| DE | WO 00/72604 A1 | 11/2000 | |
| EP | 62143571 | 6/1987 | |
| EP | 01103378 | 4/1989 | |
| EP | 0 466 929 A1 | 1/1992 | |
| EP | 06133320 | 5/1994 | |
| EP | 605898 A1 * | 7/1994 | ......... H01L/27/146 |
| EP | 08009391 | 1/1996 | |
| EP | 0707416 A2 | 4/1996 | |
| EP | 08095670 | 4/1996 | |
| EP | 09128091 | 5/1997 | |
| EP | 0 777 379 A1 | 6/1997 | |
| EP | 0 854 516 A2 | 7/1998 | |

(List continued on next page.)

OTHER PUBLICATIONS

Decker, Steven John; "A Wide Dynamic Range CMOS Imager With Parallel On–Chip Aanlog–to–Digital Conversion"; Sep. 5, 1997; pp. 14, 82–90; Massachusetts Institute of Technology.*

(List continued on next page.)

Primary Examiner—Andrew Christensen
Assistant Examiner—Brian Genco
(74) Attorney, Agent, or Firm—Sierra Patent Group, Ltd.

(57) ABSTRACT

A triple-slope MOS active pixel sensor disposed on a semiconductor substrate comprises first and second capacitive storage elements each having a first terminal connected to a fixed potential and a second terminal. First and second photodiodes each have a first terminal connected to a fixed potential and a second terminal. The second photodiode is smaller than the first photodiode. First and second semiconductor reset switches each have a first terminal connected respectively to the second terminal of the first and second photodiodes and a second terminal connected respectively to first and second reset potentials that reverse bias the photodiodes. First and second semiconductor transfer switches each have a first terminal connected respectively to the second terminals of the first photodiode and a second terminal connected respectively to the second terminals of the first and second capacitive storage elements. First and second semiconductor amplifiers each have an input connected respectively to the second terminals of the first and second capacitive storage elements and have their outputs connected together. The first and second semiconductor reset switches and the first and second semiconductor transfer switches each have a control element connected to a control circuit for selectively activating the first and second semiconductor reset switches and the first and second semiconductor transfer switches.

8 Claims, 10 Drawing Sheets

U.S. PATENT DOCUMENTS

| | | |
|---|---|---|
| 3,971,065 A | 7/1976 | Bayer |
| 3,988,619 A | 10/1976 | Malaviya et al. |
| 4,011,016 A | 3/1977 | Layne et al. |
| 4,236,760 A | 12/1980 | Haar et al. |
| 4,238,760 A * | 12/1980 | Carr .......................... 257/443 |
| 4,309,604 A | 1/1982 | Yoshikawa et al. |
| 4,363,963 A | 12/1982 | Ando |
| 4,473,836 A | 9/1984 | Chamberlain |
| 4,499,529 A | 2/1985 | Figueroa |
| 4,499,590 A | 2/1985 | Bluzer |
| 4,573,077 A | 2/1986 | Imai |
| 4,613,895 A | 9/1986 | Burkey et al. |
| 4,626,915 A | 12/1986 | Takatsu |
| 4,651,001 A | 3/1987 | Harada et al. |
| 4,654,714 A | 3/1987 | Hurst, Jr. et al. |
| 4,677,289 A | 6/1987 | Nozaki et al. |
| 4,704,633 A | 11/1987 | Matsumoto |
| 4,734,776 A | 3/1988 | Wang et al. |
| 4,742,238 A | 5/1988 | Sato |
| 4,786,818 A | 11/1988 | Mead et al. |
| 4,809,075 A | 2/1989 | Akimoto et al. |
| 4,839,735 A | 6/1989 | Kyomasu et al. |
| 4,845,553 A | 7/1989 | Konomura et al. |
| 4,875,091 A | 10/1989 | Yamada et al. |
| 4,901,129 A | 2/1990 | Hynecek |
| 4,942,473 A | 7/1990 | Zeevi et al. |
| 5,014,107 A | 5/1991 | Vora |
| 5,021,853 A | 6/1991 | Mistry |
| 5,038,214 A | 8/1991 | Miida |
| 5,055,418 A | 10/1991 | Vora |
| 5,117,292 A | 5/1992 | Matsunaga |
| 5,161,024 A | 11/1992 | Oishi |
| 5,227,887 A | 7/1993 | Dohi et al. |
| 5,241,575 A | 8/1993 | Miyatake et al. |
| 5,276,521 A | 1/1994 | Mori |
| 5,289,023 A | 2/1994 | Mead |
| 5,317,174 A | 5/1994 | Hynecek |
| 5,335,015 A | 8/1994 | Cooper et al. |
| 5,341,008 A | 8/1994 | Hynecek |
| 5,355,165 A | 10/1994 | Kosonocky et al. |
| 5,396,289 A | 3/1995 | Nakamura |
| 5,397,734 A | 3/1995 | Iguchi et al. |
| 5,414,464 A | 5/1995 | Sasaki |
| 5,414,465 A | 5/1995 | Kodama et al. |
| 5,414,683 A | 5/1995 | Tani |
| 5,424,223 A | 6/1995 | Hynecek |
| 5,428,390 A | 6/1995 | Cooper et al. |
| 5,434,620 A | 7/1995 | Higuchi et al. |
| 5,436,661 A * | 7/1995 | Yamamoto et al. ......... 348/264 |
| 5,461,425 A | 10/1995 | Fowler et al. |
| 5,471,245 A | 11/1995 | Cooper et al. |
| 5,502,299 A | 3/1996 | Standley |
| 5,541,402 A | 7/1996 | Ackland et al. |
| 5,541,654 A | 7/1996 | Roberts |
| 5,547,881 A | 8/1996 | Wang et al. |
| 5,572,074 A | 11/1996 | Standley |
| 5,576,763 A | 11/1996 | Ackland et al. |
| 5,589,423 A | 12/1996 | White et al. |
| 5,625,210 A | 4/1997 | Lee et al. |
| 5,631,704 A | 5/1997 | Dickinson et al. |
| 5,668,596 A | 9/1997 | Vogel |
| 5,705,441 A | 1/1998 | Wang et al. |
| 5,712,682 A | 1/1998 | Hannah |
| 5,739,562 A | 4/1998 | Ackland et al. |
| 5,742,058 A | 4/1998 | Pantigny et al. |
| 5,801,657 A | 9/1998 | Fowler et al. |
| 5,883,421 A | 3/1999 | Ben Chouikha et al. |
| 5,965,875 A * | 10/1999 | Merrill ..................... 250/226 |
| 6,078,037 A | 6/2000 | Booth, Jr. |
| 6,115,066 A | 9/2000 | Gowda et al. |
| 6,246,436 B1 * | 6/2001 | Lin et al. .................... 348/308 |
| 6,348,681 B1 * | 2/2002 | Kindt et al. ............. 250/208.1 |
| 6,512,544 B1 * | 1/2003 | Merrill et al. .............. 348/302 |

FOREIGN PATENT DOCUMENTS

| | | |
|---|---|---|
| JP | 54-108628 | 8/1979 |
| JP | 58-83824 | 5/1983 |
| JP | 59-152424 | 8/1984 |
| JP | 59-42527 | 9/1984 |
| JP | 60-53912 | 3/1985 |
| JP | 60-23841 | 6/1985 |

OTHER PUBLICATIONS

Abbas El Gamal, et al. *"Modeling and Estimation of FPN Components in CMOS Image Sensors"*, Information Systems Laboratory, Stanford University, and Fudan University, Shanghai, China, pp. 1–10, (sometime after 1/98).

Albert J. P. Theuwissen, *"Solid–State Imaging with Charge–Coupled Devices"*, Kluwer Academic Publishers, 1997, Chapter 5, pp. 131–141.

Alex Dickinson, et al., *"TP 13.5 : A 256 × 256 CMOS Active Pixel Image Sensor With Motion Detection"*, IEEE International Solid–State Circuits Conference, 1995, pp. 226–227.

Andrew J. Blanksby, et al. *"Noise Performance of a Color CMOS Photogate Image Sensor"*, IEEE, IEDM, 1997, pp. 202–204.

Bob Weibel, *"High–End Digital Cameras Can Make Professional Indoor Photography A Snap"*, Buyer's Guide, Published Apr. 1997, pp. 71–78.

Carver, A. Mead, et al. *"Scanners For Visualizing Activity of Analog VLSI Circuitry"*, California Institute of Technology Computation and Neural Systems Program, Jul. 5, 1991, pp. 2–29.

Chye Huat Aw, et al. *"A 128 × 128–Pixel Standard–CMOS Image Sensor With Electronic Shutter"*, IEEE International Solid–State Circuits Conference 1996, pp. 4–39 to 4–40.

Don Sutherland, *"Neaveau Niche–Part I, The Latest in Digital SLRs"*, Shutterbug, Nov. 1997, pp. 192, 193, 202, 208 & 210.

D. Knipp, et al. *"Low Cost Approach to Realize Novel Detectors For Color Recognition"*, Forschungszentrum Julich GmbH, ISI–PV,(year unknown), pp. 350–353.

Eric R. Fossum, *"Active Pixel Sensors: Are CCD's Dinosaurs?"*, SPIE vol. 1900, 7/93, pp. 2–14.

Guang Yang, et al. *"A Snap–Shot CMOS Active Pixel Imager For Low–Noise, High–Speed Imaging"*, IEEE, 1998, pp. 45–48.

Hon–Sum Philip Wong, *"CMOS Image Sensors–Recent Advances and Device Scaling Considerations"*, IEDM, 1997 IEE, pp. 201–204.

Hon–Sum Philip Wong, et al. *"CMOS Active Pixel Image Sensors Fabricated Using a 1.8–V, 0.25–μm CMOS Technology"*, IEEE, Apr., 1998, pp. 889–894.

Hon–Sum Wong, et al. *"Technology and Device Scaling Considerations for CMOS Imagers"*, IEEE Transactions on Electron Devices, vol. 43 No. 12, Dec. 1996, pp. 2131–2142.

Ken Parulski, et al. *"Enabling Technologies for a Family of Digital Cameras"*, Eastman Kodak Company, SPIE vol. 2654, 1996, Invited Paper, pp. 156–163.

Mohamed Ben Chouikha, et al. *"Buried Triple–p–n Junction Structure in a BiCMOS Technology for Color Detection"*, IEEE BCTM 6.4, Sep. 1997 pp. 108–111.

Mohamed Ben Chouikha, et al. *Color Sensitive Photodetectors in Standard CMOS and BiCMOS Technologies*, SPIE vol. 2950, 1996, pp. 108–120.

Orly Yadid–Pecht, et al. "*A Random Access Photodiode Array for Intelligent Image Capture*", IEEE Transactions on Electron Devices, vol. 38, No. 8, Aug. 1991, pp. 1772–1780.

R. Daniel McGrath, et al. "*FA 11.2: Current–Mediated, Current–Reset 768 × 512 Active Pixel Sensor Array*", IEEE Digest of Technical Papers, Feb. 7, 1997, pp 182–183, 138–139.

R.M. Guidash, et al. "*A 0.6 μm CMOS Pinned Photodiode Color Imager Technology*", IEDM, 1997, pp. 927–929.

R. Panicacci, "*1/4 Inch CMOS Active Pixel Sensor With Smart On–Chip Functions and Full Digital Interface, Part 1., Brief Introduction to CMOS Image Sensors*", Hot Chips IX, Aug. 25–26, 1997, pp. 41–53.

Savvas G. Chamberlain, "*Photosensitity and Scanning of Silicon Image Detector Arrays*" IEEE Journal of Solid–State Circuits, vol. SC–4, No. 6, Dec. 1969, pp. 333–342.

Stephen John Decker, "*A Wide Dynamic Range CMOS Imager with Parallel On–Chip Analog–to Digital Conversion*", Submitted to the Department of Electrical Engineering and Computer Science at Massachusetts Institute of Technology, Sep. 1977, pp. 3–205.

Sunetra K. Mendis, et al. "*A 128 × 128 CMOS Active Pixel Image Sensor for Highly Integrated Imaging Systems*", IEEE, 1993, pp. 583–586.

T. Delbruck et al, "*Analog VLSI Phototransduction by Continuous–time, Adaptive, Logarithmic Photoreceptor Circuits*", California Institute of Technology Computation and Neural Systems Program, CNS Memo No. 30, Apr. 2, 1996, pp. 24.

Tobi Delbruck, et al. "*Analog VLSI Adaptive, Logarithmic, Wide–Dynamic–Range Photoreceptor*", IEEE, May 1994, pp. 4 pages.

Tatsuo Nomoto, et al. "*FA 11.4: A 4M–Pixel CMD Image Sensor With Block and Skip Access Capability*", IEEE International Solid–State Circuits Conference 1997, 6 pages.

Hiroki Miura, et al., "*A 100 Frame/s CMOS Active Pixel Sensor For 3D–Gesture Recognition System*", IEEE International Solid–State Circuits Conference, Jun. 1999, pp. 142–143.

Yoshiaki Hagiwara, "*High–Density and High–Quality Frame Transfer CCD Imager With Very Low Smear, Low Dark Current, and Very High Blue Sensitivity*", IEEE Transactions on Electron Devices, vol. 43, No. 12, Dec. 1996, pp. 2122–2130.

D. Renshaw, et al., "*ASIC Image Sensors*", IEEE, 1990, pp. 3038–3041.

Peter B. Denyer, et al., "*On–Chip CMOS Sensors For VLSI Imaging Systems*", VLSI 91, Proceedings of the IFIP TC 10/WG 10.5 International Conference on Very Large Scale Integration, Aug. 1991, pp. 4b.1.1 to 4b.2.1.

J.E.D. Hurwitz, et al. "*An 800K–Pixel Color CMOS Sensor For Consumer Still Cameras*", SPIE vol. 3019, 1997, pp. 115–124.

Rudolph H. Dyck et al., "*Integrated Arrays of Silicon Photodetectors For Image Sensing*", IEEE Transactions on Electron Devices, vol. ED–15, No. 4, Apr. 1968, pp. 196–201.

Peter J. W. Noble, "*Self–Scanned Silicon Image Detector Arrays*", IEEE Transactions on Electron Devices, vol. ED–15, No. 4, Apr. 1968, pp. 202–208.

G. Sadasiv, et al., "*Thin–Film Circuits For Scanning Image–Sensor Arrays*", Transactions on Electron Devices, vol. ED–15, No. 4, Apr. 1968, pp. 215–219.

Thierry M. Bernard, "Advanced Focal Plane Arrays and Electronic Cameras", Proceedings EurOpt Series, vol. 2950, Oct. 1996, pp. 111–120.

S. Decker et al, "*A 256 × 256 CMOS Imaging Array With Wide Dynamic Range Pixels and Column–Parallel Digital Output*", IEEE International Solid–State Circuits Conf., 1998, pp. 176–177.

Electrically Erasable and Reprogrammable Read–Only Memory Using the n–Channel SIMOS One–Transistor Cell; IEEE Transactions on Electron Devices, vol. ED–24, No. 5, May 1977, Bernward Rossler.

Physics of Semiconductor Devices; Wiley–Interscience; Murray Hill, New Jersey; Bell Telephone Laboratories, Inc., S.M. SZE, 1969.

* cited by examiner

TRIPLE SLOPE PIXEL SENSOR AND ARRY

BACKGROUND OF THE INVENTION

1. Field of the Invention

The present invention relates to MOS active pixel sensors. More particularly, the present invention relates to a MOS active pixel sensor having a triple slope light-to-output-voltage transfer gain characteristic.

2. The Prior Art

Integrated image sensors are known in the art. Such sensors have been fabricated from charge-coupled devices (CCDs) and as bipolar and MOS image sensors.

In the CCD imager art, on-chip frame storage capability has been employed previously. It has been motivated by the need to shift sensed charges out during a video frame time without letting them be contaminated by further exposure as the charges travel across the CCD array. Two storage techniques are commonly employed in the CCD imager art. According to the first technique, a second separate on-chip CCD array is provided under a light shield, and the entire image is quickly shifted along one dimension into the storage array, since shifting in one dimension is fast enough to avoid significant contamination. According to the second technique, line-storage CCDs are provided between the lines of sensors, with local light shielding. In the CCD art, techniques have been developed for preventing leakage and contamination due to minority carrier diffusion and leakage, but these techniques are not applicable to the CMOS sensor array because the silicon fabrication processes are different.

CMOS image sensors and image sensor circuitry may be organized in a manner similar to that which is disclosed in co-pending application Ser. No. 08/969,383, filed Nov. 13, 1997. Individual pixel sensors may be designed in a number of different ways. One possible pixel sensor design comprises a photodiode having its anode connected to a fixed voltage potential such as ground. The cathode of the photodiode is connectable to an amplifier. The cathode of the photodiode is also connectable to a reference potential via a reset switch so that the photodiode is reverse biased. The output of the amplifier is attached to a row-select switch, which is connected to a row select line and a column line.

The pixel sensor is first reset by turning on the reset switch. Then the reset switch is then turned off so that integration of photocurrent from the photodiode can begin. The current from the photodiode is integrated on the amplifier input node capacitance to form a voltage signal. At the appropriate time, the voltage on the row select line is raised, which activates the row-select switches in each pixel sensor in the row. This allows the amplifier to drive column line. The column line then leads down to more circuitry that will typically amplify and store the signal, and then convert the signal into digital form for inclusion in a digital pixel stream.

Another possible pixel sensor design provides for storage of the signal within the pixel sensor and is thus referred to as a storage pixel sensor. A storage pixel sensor comprises a photodiode having its anode connected to a fixed voltage potential such as ground. The cathode of the photodiode is connectable to a storage capacitor via a transfer switch. The storage capacitor has a first plate connected to the transfer switch and a second plate connected to a fixed potential such as ground.- The cathode of the photodiode is also connectable to a reference potential via a reset switch so that the photodiode is reverse biased. An amplifier has its input connected to the storage capacitor. The output of the amplifier is attached to a row-select switch, which is connected to a row select line and a column line.

The storage pixel sensor is first reset by turning on both reset switch and transfer switch. Then the reset switch is turned off so that integration of photocurrent from the photodiode can begin. Since the transfer switch is turned on, the capacitance of the storage capacitor adds to the capacitance of the photodiode during integration, thereby increasing the charge capacity and therefore intensity range of the storage-pixel sensor. This also reduces variation in the pixel output due to capacitance fluctuations since gate oxide capacitance from which the storage capacitor is formed is better controlled than junction capacitance of the photodiode.

When the integration is complete (determined by exposure control circuitry, not shown), the transfer switch is turned off, isolating the voltage level corresponding to the integrated photocharge on the storage capacitor. Shortly thereafter, the photodiode itself is reset to the reference voltage by again turning on the reset switch. This action will prevent the photodiode from continuing to integrate during the readout process and possibly overflowing excess charge into the substrate which could affect the integrity of the signal on the storage element.

After the reset switch is turned back on, the readout process can begin. At the appropriate time, voltage on the row select line is raised, which activates the row-select switches in each pixel sensor in the row. This allows the current from the amplifier to travel to the column line. The column line is coupled to more circuitry that will typically amplify the signal, and then convert the signal into digital form for inclusion in a digital pixel stream.

One problem encountered with prior-art imagers is a limitation on the dynamic range of images that can be captured by the array. Images that contain both low-light-level pixels and high-light-level pixels could be improved if the dynamic range of the imager could be increased.

In an active pixel sensor, the sensitivity of measuring charges generated by photons can be described as a charge-to-voltage gain or light-to-output-voltage transfer gain. Typically, in a prior art active pixel sensor, this gain is accounted for by two factors. A first factor is the reciprocal of the capacitance of the charge accumulation node in the sensor where photocharge accumulates to change a potential (a reciprocal capacitance represents units of volts per coulomb). A second factor is the gain of the readout amplifier, typically less than one using a source follower. Voltage dependence of the photodiode capacitance and other capacitances, and nonlinearities of the readout amplifier transistor can make the gain vary with level, so that the overall transfer curve may be somewhat nonlinear. A nonlinearity in which higher light intensities give lower gains is said to be compressive. A significant degree of compressive nonlinearity can have a beneficial effect on the signal-to-noise ratio of the image at low light levels, and can thereby enhance the usable dynamic range of the imager.

It is therefore an object of the present invention to provide a pixel sensor and an array of pixel sensors that overcome some of the shortcomings of the prior art.

A further object of the present invention is to provide a storage pixel sensor and an imaging array of storage pixel sensors that includes image level compression.

Another object of the present invention is to provide a storage pixel sensor and an imaging array of storage pixel sensors that includes multi-breakpoint image level compression.

BRIEF DESCRIPTION OF THE INVENTION

According to the present invention, a storage pixel sensor having built-in compression is disclosed. The pixel sensor of the present invention has a first light-to-output-voltage transfer gain up to a first light integration threshold, a second light-to-output-voltage transfer gain lower than the first light-to-output-voltage transfer gain up to a second light integration threshold, and a third light-to-output-voltage transfer gain less than the second light-to-output-voltage transfer gain after the second light integration threshold. The storage pixel of the present invention may be referred to herein as a triple-slope active pixel sensor and has a larger dynamic range than pixel sensors without this feature.

A triple-slope MOS active pixel sensor disposed on a semiconductor substrate comprises a first capacitive storage element having a first terminal connected to a fixed potential and a second terminal and a second capacitive storage element having a first terminal connected to a fixed potential and a second terminal. A first photodiode of a first size has a first terminal connected to a fixed potential and a second terminal. A second photodiode smaller than the first photodiode has a first terminal connected to a fixed potential and a second terminal. The first terminals of the first and second photodiodes are usually, but not necessarily, connected to the same potential such as ground.

A first semiconductor reset switch has a first terminal connected to the second terminal of the first photodiode and a second terminal connected to a first reset potential that reverse biases the first photodiode. A second semiconductor reset switch has a first terminal connected to the second terminal of the second photodiode and a second terminal connected to a second reset potential that reverse biases the second photodiode.

A first semiconductor transfer switch has a first terminal connected to the second terminal of the first photodiode and a second terminal connected to the second terminal of the first capacitive storage element. A second semiconductor transfer switch has a first terminal connected to the second terminal of the second photodiode and a second terminal connected to the second terminal of the second capacitive storage element.

A first semiconductor amplifier has an input connected to the second terminal of the first capacitive storage element and an output. A second semiconductor amplifier has an input connected to the second terminal of the second capacitive storage element and an output. The first and second capacitive storage elements may each comprise the gate capacitance of a source follower transistor that the semiconductor amplifier comprises.

The first and second semiconductor reset switches and the first and second semiconductor transfer switches each have a control element connected to a control circuit for selectively activating the first and second semiconductor reset switches and the first and second semiconductor transfer switches.

In operation, the pixel sensor is first reset: the potentials of the second terminals of the first photodiode and the first storage capacitance are reset to the first reset potential, and the potentials of the second terminals of the second photodiode and the second storage capacitance are reset to the second reset potential. The reset switches are then turned off, by taking their gates to a potential that establishes overflow potential barriers in their channels. The transfer switches are on during the reset and the subsequent exposure interval. The supply voltage to the first amplifier transistor drain is switched high at some time during the photointegration, for example near the beginning of the exposure interval. High-gain conversion of integrated photocharge takes place on the first storage capacitance until the integrated voltage reaches a barrier level set by the gate of the transfer switch, after which conversion of photocharge continues on the first storage capacitance and the first photodiode at a lower gain; finally, integration of charge from the smaller photodiode, continuing on the second storage capacitance, dominates the pixel sensor output signal when the voltage of the second storage capacitance exceeds the voltage on the first storage capacitance. The three different light-to-voltage conversion gains, or slopes, give the pixel sensor a beneficial compressive characteristic.

BRIEF DESCRIPTION OF THE DRAWING FIGURES

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure. For example, the illustrative embodiments of the present invention are disclosed using all N-Channel MOS transistor switches, but other technologies could be employed as well.

Figure 1A:
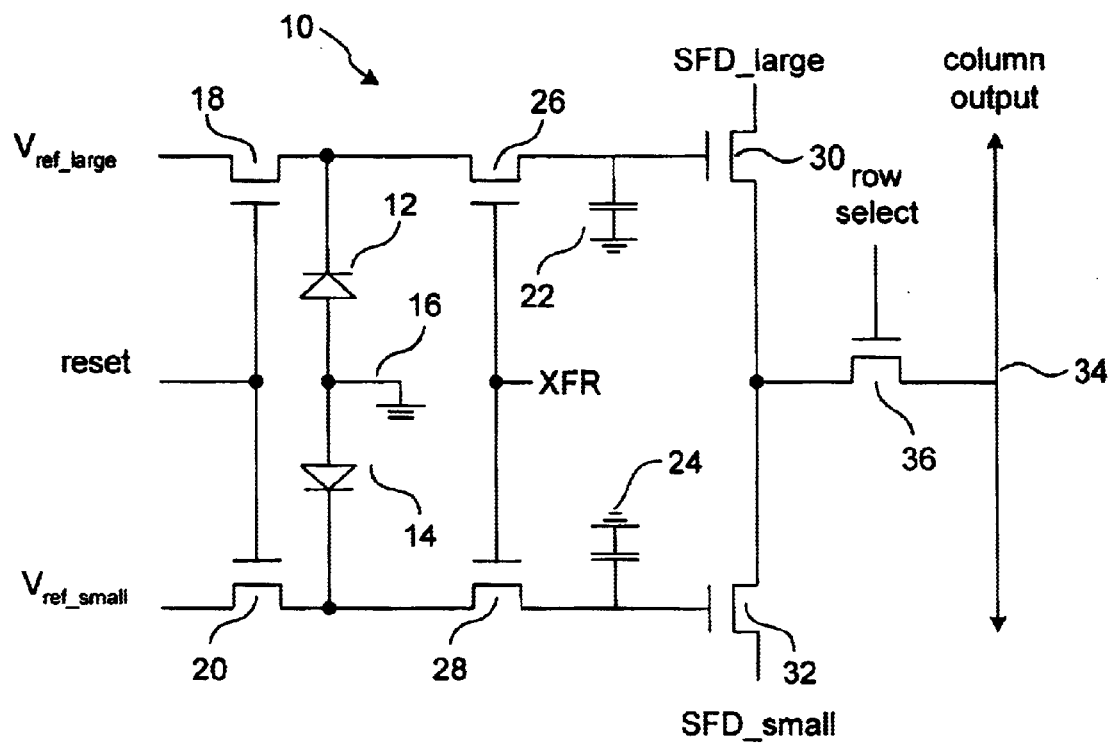
FIG. 1A is a schematic diagram of a triple-slope MOS active pixel sensor according to one embodiment of the present invention.

Referring first to FIG. 1A, a schematic diagram of an illustrative embodiment of a triple-slope MOS active pixel sensor 10 according to the present invention is shown. First and second photodiodes 12 and 14, respectively, are shown having their anodes connected to ground potential at reference numeral 16. Photodiode 12 is larger than photodiode 14. Typically, photodiode 12 may be about 10 square microns and photodiode 14 may be less than one square micron.

The cathode of photodiode 12 is connected to the source of N-Channel MOS Reset transistor 18 and the cathode of photodiode 14 is connected to the source of N-Channel MOS Reset transistor 20. The drain of N-Channel MOS Reset transistor 18 is connected to a first Reset potential Vref Large having a potential on the order of about +2 volts. The drain of N-Channel MOS Reset transistor 20 is connected to a second Reset potential Vref Small having a potential on the order of about +0.8 volts. The gates of N-Channel MOS Reset transistors 18 and 20 are connected to a source of a RESET signal having an active high level of about 3 volts and an inactive low level of about +0.5 volts. All voltages are referred to ground, which is typically the potential of the substrate.

Triple-slope MOS active pixel sensor 10 includes two capacitive storage nodes 22 and 24. Capacitive storage node 22 is coupled to the cathode of photodiode 12 through N-Channel MOS transfer transistor 26 and capacitive storage node 24 is coupled to the cathode of photodiode 14 through N-Channel MOS transfer transistor 28. The gates of both N-Channel MOS transfer transistors 26 and 28 are connected to a source of a XFR signal having an active high barrier level of about +2.5 volts and an inactive low level of about zero volts.

According to a presently preferred embodiment of the invention, capacitive storage nodes 22 and 24 are not formed from discrete capacitors but rather comprise the individual inherent gate capacitances, respectively, of the N-Channel MOS source-follower amplifier transistors 30 and 32. N-Channel MOS source-follower amplifier transistor 30 has its gate connected to N-Channel MOS transfer transistor 26, and its drain connected to a pulsed supply voltage SFD Large. N-Channel MOS source-follower amplifier transistor 32 has its gate connected to N-Channel MOS transfer transistor 28, and its drain connected to a pulsed supply voltage SFD Small. The SFD Large and SFD Small voltages are typically near +0.1 volts during reset and at +3 volts during readout; SFD Large switches to the high state during integration and SFD Small switches to the high state after the end of integration.

The sources of both N-Channel MOS source-follower amplifier transistors 30 and 32 are coupled to COLUMN OUTPUT line 34 through N-Channel MOS Row-select transistor 36. The gate of N-Channel MOS Row-select transistor 36 is driven by a source of a ROW SELECT signal having an active high level of about 3 volts and an inactive low level of about zero volts. COLUMN OUTPUT line 34 is one of the column output lines in an array of pixels of the present invention. Persons of ordinary skill in the art will appreciate that, in such an array, a row of pixel data selected by assertion of a row select line will be presented on column output lines of the array as known in the art.

Persons of ordinary skill in the art will also understand that, as the geometries of the devices in the triple-slope MOS active pixel sensor 10 of the present invention are scaled down, the voltage potentials of the various reference voltages and signal voltages will also be scaled down.

Figure 1B:
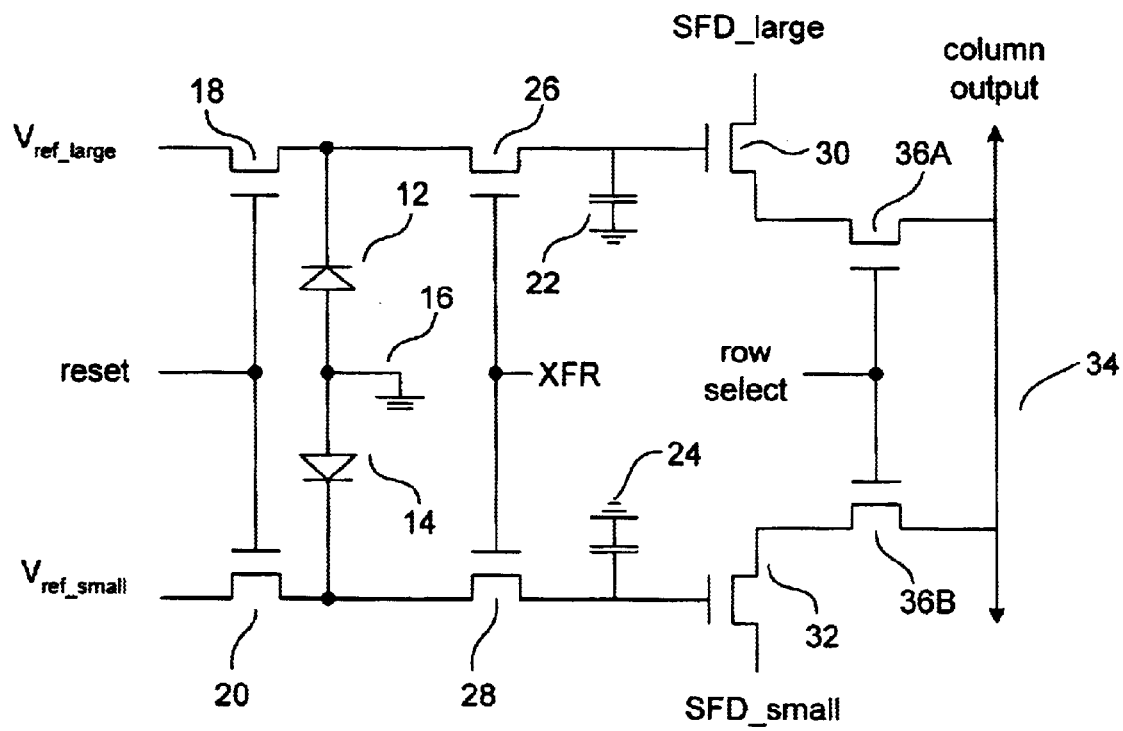
FIG. 1B is a schematic diagram of a triple-slope MOS active pixel sensor according to one alternate embodiment of the present invention.

Referring now to FIG. 1B, a schematic diagram of a triple-slope MOS active pixel sensor according to one alternate embodiment of the present invention is shown. The triple-slope MOS active pixel sensor of FIG. 1B is similar in most respects to the triple-slope MOS active pixel sensor of FIG. 1A and the corresponding circuit elements of FIGS. 1A and 1B will be identified by like reference numerals. The difference between the embodiments of FIGS. 1A and 1B is that individual N-Channel MOS Row-select transistors 36A and 36B are employed to couple the sources of N-Channel MOS source follower transistors 30 and 32, respectively, to column select line 34. The circuit of FIG. 1B operates in all respects identically to the circuit of FIG. 1A.

Figure 2:
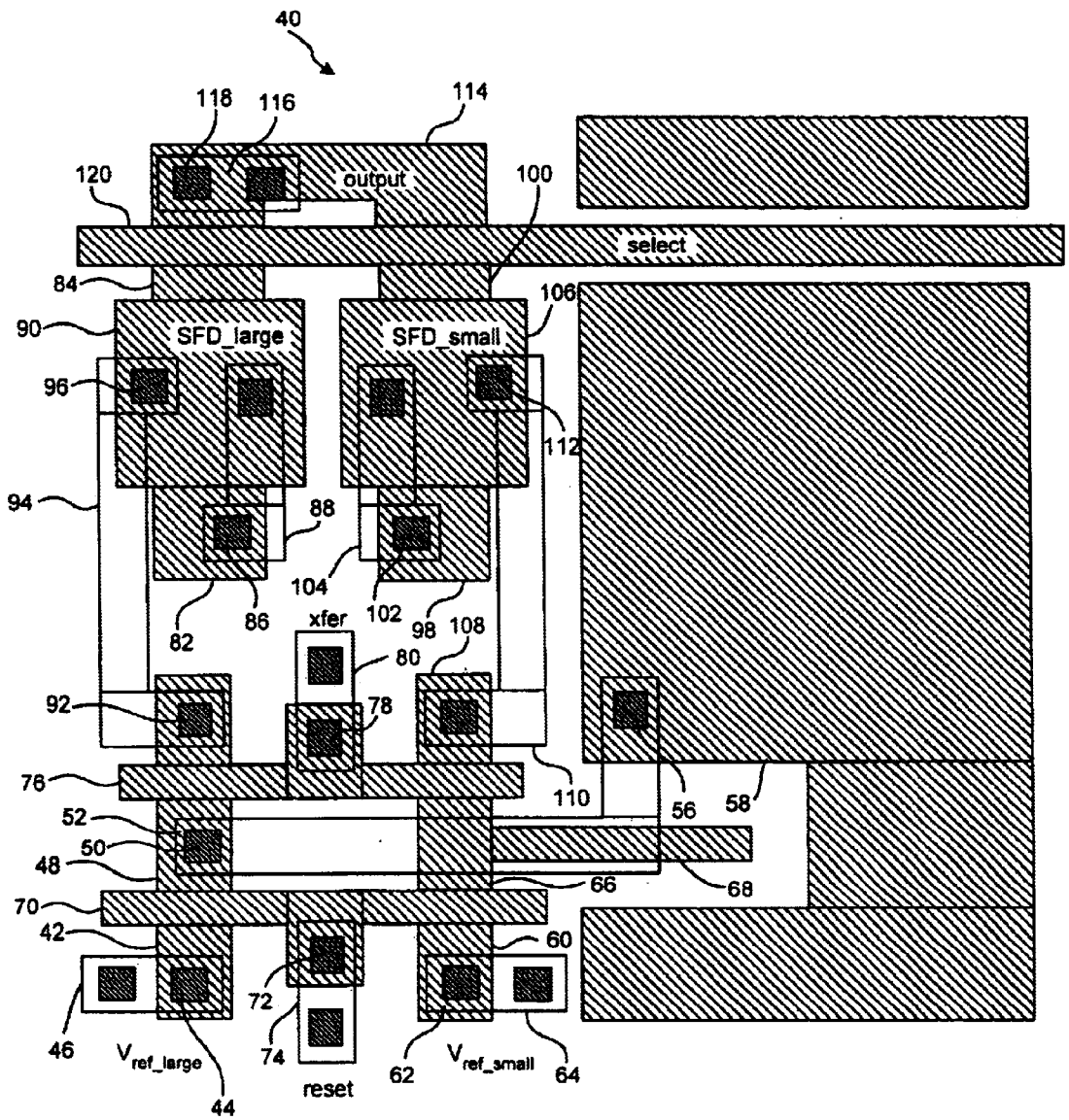
FIG. 2 is a top view of a typical layout for the triple-slope MOS active pixel sensor of FIG. 1B.

Referring now to FIG. 2, a top view of a typical semiconductor layout design 40 for the triple-slope MOS active pixel sensor 10 of FIG. 1B is shown. Diffused region 42 forms the drain of N-Channel MOS Reset transistor 18 of FIG. 1B and is connected to a source of Vref Large voltage by contact 44 and metal line 46. Diffused region 48 forms the source of N-Channel MOS Reset transistor 18 of FIG. 1 as well as the drain of N-Channel MOS Transfer transistor 26. Contact 50, metal line 52, and contact 54 are used to connect this diffused region to the large-area region 56 which forms the cathode of photodiode 12 of FIG. 1B.

Diffused region 60 forms the drain of N-Channel MOS Reset transistor 20 of FIG. 1B and is connected to a source of Vref Small voltage by contact 62 and metal line 64. Diffused region 66 forms the source of N-Channel MOS Reset transistor 20 of FIG. 1B as well as the drain of N-Channel MOS Transfer transistor 28. A finger 68 laterally extending from diffused region 66 forms the cathode of photodiode 14 of FIG. 1B. Persons of ordinary skill in the art will note the difference in the areas of diffused region 58 and 68. As presently contemplated, the ratio of the sizes of photodiodes 12 and 14 in the present invention is in the range of from about 10 to about 100.

Polysilicon line 70 forms the gates of both N-Channel MOS Reset transistors 18 and 20 of FIG. 1B and is connected to a RESET control signal through contact 72 and metal line 74. Polysilicon line 76 forms the gates of both N-Channel MOS Transfer transistors 26 and 28 of FIG. 1B and is connected to a XFR control signal through contact 78 and metal line 80.

Diffused region 82 forms the drain of the N-Channel MOS source-follower amplifier transistor 30 of FIG. 1B and diffused region 84 forms its source. Diffused region 82 is connected to a pulsed supply voltage SFD Large through contact 86 and metal line 88. The gate of N-Channel MOS source-follower amplifier transistor 30 is formed from polysilicon region 90, disposed over and between diffused regions 82 and 84, and is connected to the source of N-Channel MOS Transfer transistor 26 via contact 92, metal line 94, and contact 96.

Diffused region 98 forms the drain of the N-Channel MOS source-follower amplifier transistor 32 of FIG. 1B and diffused region 100 forms its source. Diffused region 98 is connected to a pulsed supply voltage SFD Small through contact 102 and metal line 104. The gate of N-Channel MOS source-follower amplifier transistor 32 is formed from polysilicon region 106, disposed over and between diffused regions 98 and 100, and is connected to the source of N-Channel MOS Transfer transistor 28 via contact 108, metal line 110, and contact 112.

Diffused region 84 also forms the drain of N-Channel MOS Row-select transistor 36A of FIG. 1B and diffused region 100 also forms the drain of N-Channel MOS Row-select transistor 36B of FIG. 1B. Diffused region 114 forms the sources of both N-Channel MOS Row-select transistors 36A and 36B of FIG. 1B. Metal line 116, connected to diffused region 114 through contact 118, forms the output column line. Polysilicon line 120 forms the gate of both N-Channel MOS Row-select transistors 36A and 36B of FIG. 1B. Persons of ordinary skill in the art would readily understand how to modify the layout of FIG. 2 to fabricate the triple slope MOS pixel sensor of FIG. 1A.

In actual embodiments of the present invention, the elements shown in the layout of FIG. 2 other than the photodiodes will be covered by a light shield (not shown), such as a portion of a metal layer in the integrated circuit, in order to prevent unwanted photogeneration of charge carriers in the circuit.

Referring now to FIGS. 3A through 3H, energy barrier diagrams are used to explain the operation of the triple-slope MOS active pixel sensor of the present invention. In each of FIGS. 3A through 3H, the energy level columns correspond to the conditions at the channels and the source and drain terminals of the reset and transfer transistors, with the left-hand column representing the larger photodiode branch of the pixel sensor and the right-hand columns representing the smaller photodiode branch of the pixel sensor. Within each column, the five energy strips shown correspond to the Vref node, the reset transistor channel, the photodiode cathode, the transfer transistor channel, and the storage node. Electron energy levels are shown as jagged lines, and energy barriers in transistor channels are shown as straight lines. The height of the columns represents voltage, but because the energy levels are represented as electrons, lower levels correspond to more positive voltages and higher levels correspond to more negative voltages.

Figure 3A:
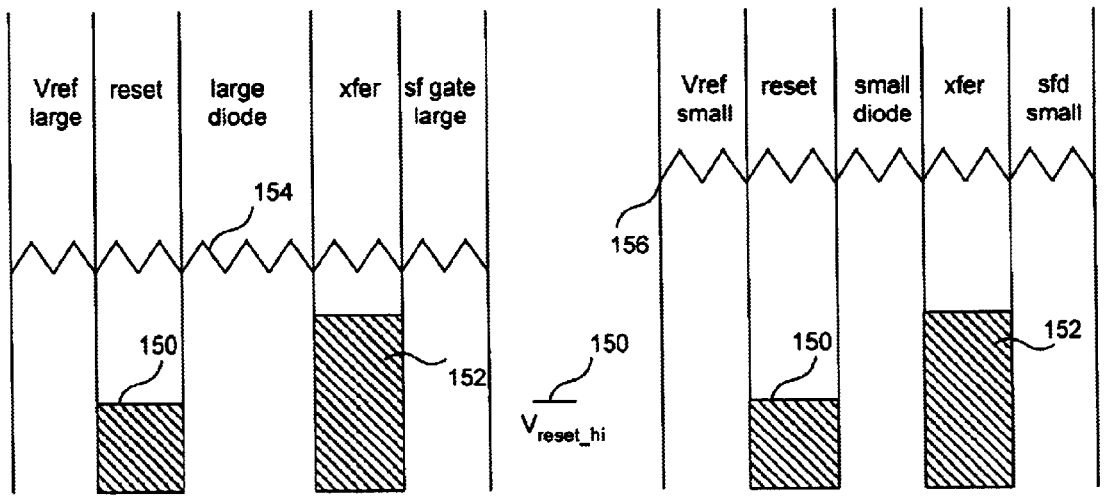
FIGS. 3A through 3H are energy barrier diagrams illustrating the operation of the triple-slope MOS active pixel sensor of FIGS. 1A and 1B.

Referring first to FIG. 3A, the triple-slope MOS active pixel sensor is reset to Vref Large and Vref Small. The N-Channel MOS Reset transistors 18 and 20 and the N-Channel MOS Transfer transistors 26 and 28 are both turned on at this time as represented by the low levels of the energy barriers drawn in the corresponding columns. The low ON-state energy barrier determined by the RESET signal, at its active high level of about +3 volts, is shown at reference numeral 150, and the low ON-state energy barrier determined by the XFR signal, at its active high barrier level of about +0.8 volts, is shown at reference numeral 152.

Under these conditions, the Vref Large reference voltage shown at reference numeral 154 is placed on the cathode of large photodiode 12 and the lower Vref Small reference voltage shown at reference numeral 156 is placed on the cathode of small photodiode 14. Because the transfer transistors 26 and 28 are turned on, the storage nodes comprising the gate capacitances of the source follower transistors 30 and 32 are charged to Vref Large, and Vref Small, respectively, as shown in FIG. 3A.

Figure 3B:
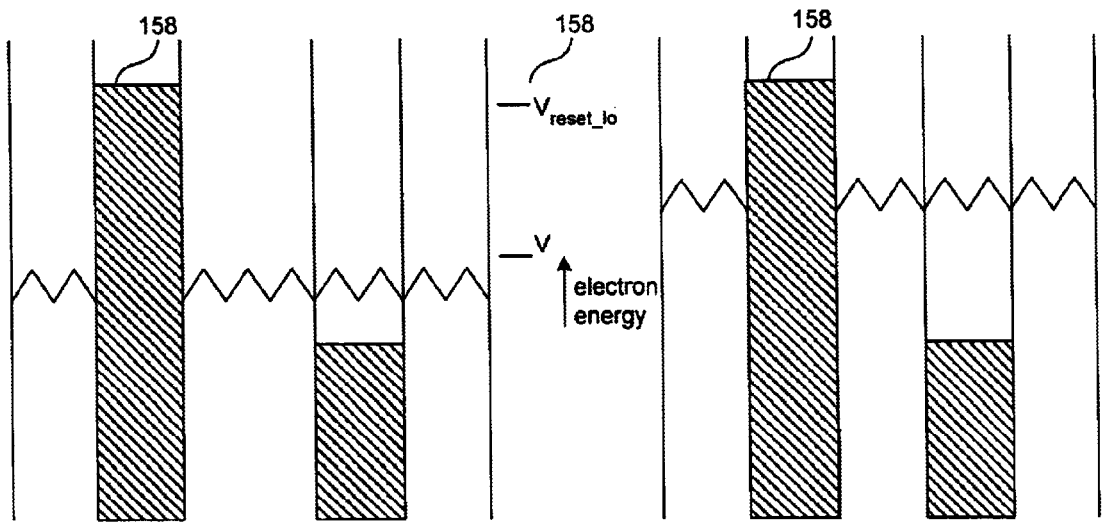

Referring now to FIG. 3B, the RESET signal level is reduced to an overflow barrier level of about +0.5 volts, shown at reference numeral 158. This action turns off N-Channel MOS Reset transistors 18 and 20. The cathode of photodiode 12 and gate capacitance of source follower transistor 30 are capacitively held near Vref Large and the cathode of photodiode 14 and gate capacitance of source follower transistor 32 are capacitively held near Vref Small.

Figure 3C:
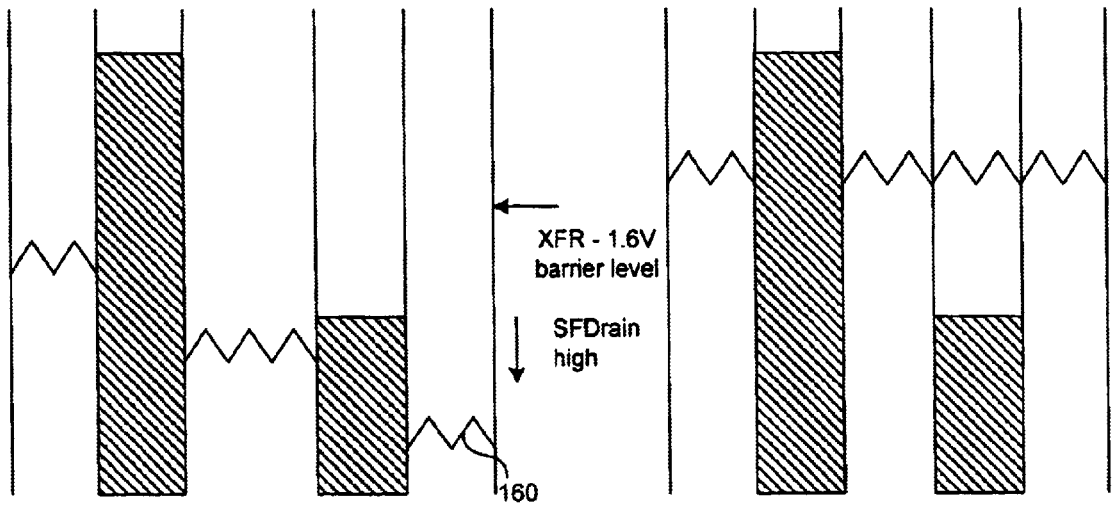

Referring now to FIG. 3C, the SFD Large voltage at the drain of N-Channel MOS source-follower transistor 30 is pulsed to high to set the large photodiode 12 to barrier gate mode as described below. The raised voltage on the drain of N-Channel MOS source-follower transistor 30 bootstraps the gate voltage through capacitive coupling to the higher voltage level shown at reference numeral 160.

Figure 3D:
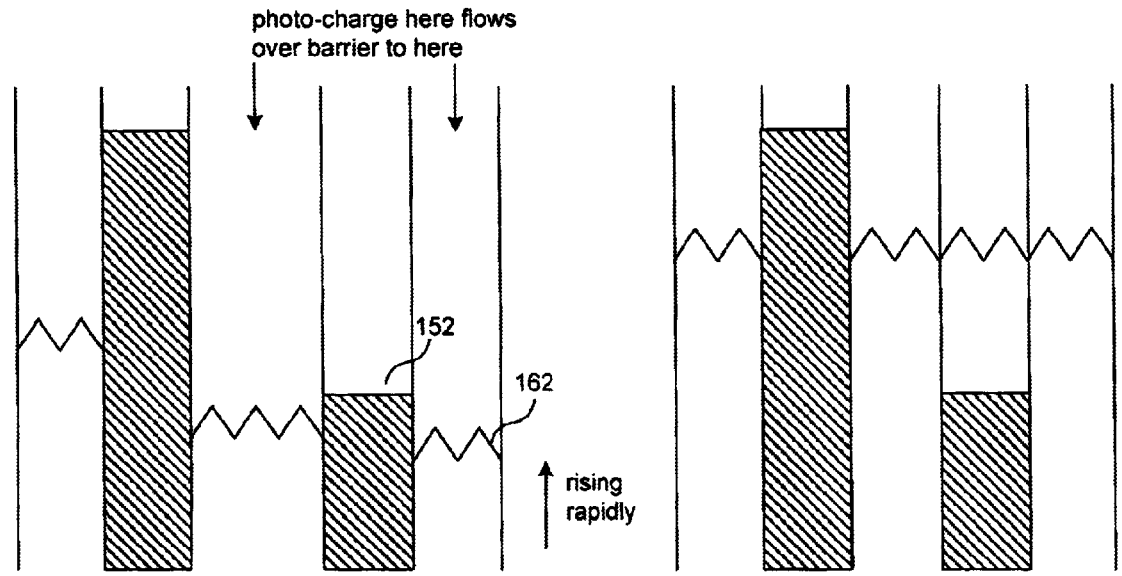
Figure 3E:
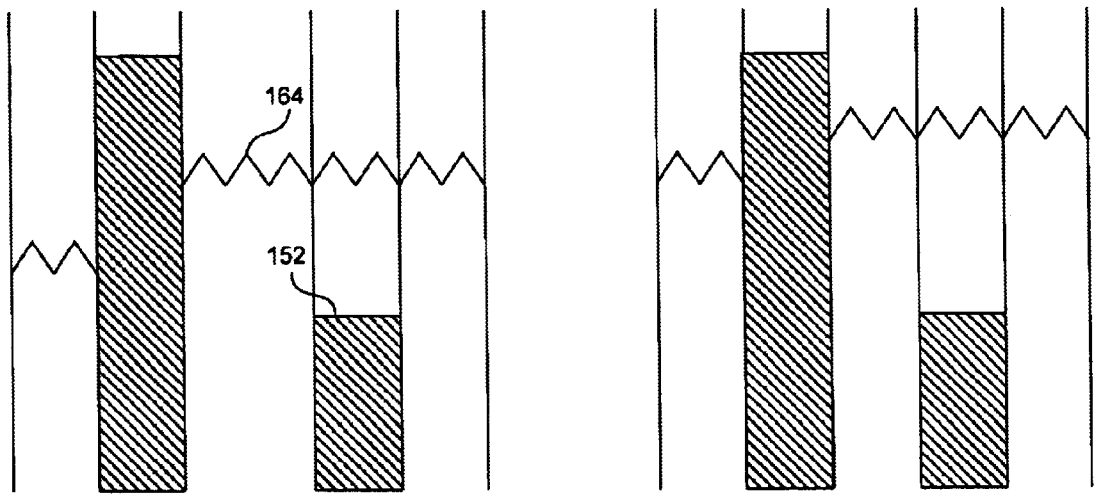
Figure 3F:
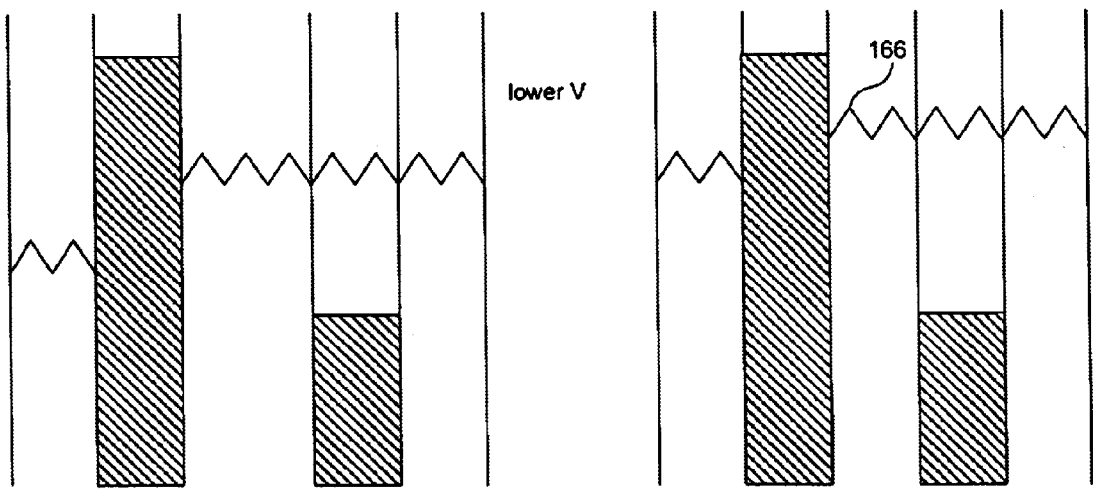
Figure 4:
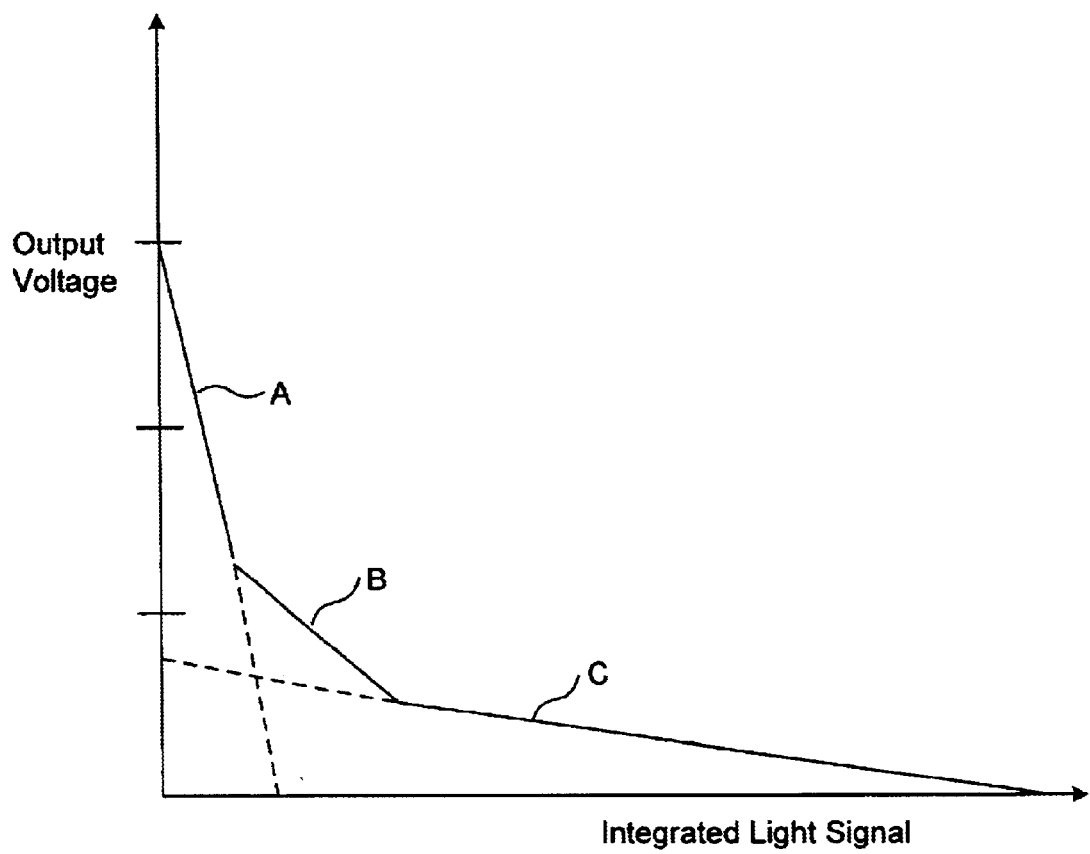
FIG. 4 is a plot of output voltage as a function of integrated light signal for the triple-slope MOS active pixel sensor of FIGS. 1A and 1B.

Under these conditions, integration of photocharge begins as shown in FIG. 3D. Charge from the cathode of large photodiode 12 is transferred to the storage node through N-Channel MOS Transfer transistor 26. Because the storage node, the gate capacitance of N-Channel MOS source-follower transistor 30, is at a higher voltage than the cathode of large photodiode 12, the accumulated charge must lower the voltage on the gate capacitance before the voltage at the cathode of large photodiode 12 can decrease. The voltage on the gate of N-Channel MOS source-follower transistor 30 decreases rapidly at reference numeral 162 as charge accumulated from the cathode of the large photodiode 12 is transferred thereto across the barrier gate of N-Channel MOS Transfer transistor 26. The rate of voltage change at the output column line or the common source node of source-follower transistors 26 and 28 of a sensor in a selected row as a function of accumulated charge during this period is shown in FIG. 4 as the steeply sloped line "A" beginning at about 3 volts on the Y axis. Typically, this voltage is only realized after the end of integration, during a readout phase, when the row-select transistor is turned on.

Referring now to FIG. 3D, when the potential at the gate capacitance of N-Channel MOS Transfer transistor drops below the level of the XFR signal barrier level, the voltages at the cathode of the large photodiode 12 and the storage node (the gate of N-Channel MOS source-follower transistor) become equal. Further accumulating photocharge causes this voltage to continue to decrease as shown at reference numeral 164, but at a rate slower than that of the storage node voltage decrease seen in FIG. 3C because of capacitive charge sharing. The rate of voltage decrease at the sensor output voltage on column line as a function of accumulated photocharge during this period is shown in FIG. 4 as the moderately-sloped line "B" beginning at about 1 volt on the Y axis. The slope of line "B" of FIG. 4 is a function of both the size of large photodiode 12 and the total capacitance of the storage node whose main component is the gate capacitance of N-Channel MOS source-follower transistor 30.

All during the charge integration period illustrated in FIG. 3B and following, accumulating charge has been integrating on the charge sharing parallel combination of the cathode of small photodiode 14 and the storage node capacitance comprising the gate capacitance of N-Channel MOS source-follower transistor 32. Because the area of photodiode 14 is small compared to the area of photodiode 12, the rate of accumulation of charge on the cathode of small photodiode 14 is slower than the rate of charge accumulation on the cathode of large photodiode 12 as may be seen by comparing the slopes of lines "A" and "C" of FIG. 4. In the embodiment of FIG. 1A the sources of source follower transistors 30 and 32 are connected together to form the pixel output. In the embodiment of FIG. 1B the sources of source follower transistors 30 and 32 are connected together through select transistors 36A and 36B during readout to form the sensor output. In either case, the voltage at the sensor output when the row is selected by an active level on Row Select will be established by the one of the two N-Channel MOS source-follower transistors that has the highest (most positive) gate voltage. Initially, the voltage at the gate of N-Channel MOS source-follower transistor 30 will be higher than the voltage at the gate of N-Channel MOS source-follower transistor 32 because of the relative values of Vref Large and Vref Small as seen in FIG. 3A. Therefore, the voltage at the node comprising the common sources of N-Channel MOS source follower transistors 30 and 32 will be established by N-Channel MOS source follower transistor 30. When the potential on the gate of N-Channel MOS source follower transistor 30 drops below that of N-Channel MOS source follower transistor 32, the more positive voltage at the gate of N-Channel MOS source follower transistor 32 will establish the output voltage of the pixel as shown at reference numeral 166 of FIG. 3F. Because this voltage is dropping more slowly than that on the gate of N-Channel MOS source follower transistor 28, the rate at which the circuit voltage continues to drop will decrease again. The rate of voltage change at the sensor output as a function of accumulated charge during this period is shown in FIG. 4 as the least steeply sloped line "C" beginning at below 1 volt on the Y axis. Persons of ordinary skill in the art will recognize that the individual slopes of lines "A" and "C" in FIG. 4 will be determined by the sizes of photodiodes 12 and 14 and capacitance values of the circuit.

Figure 3G:
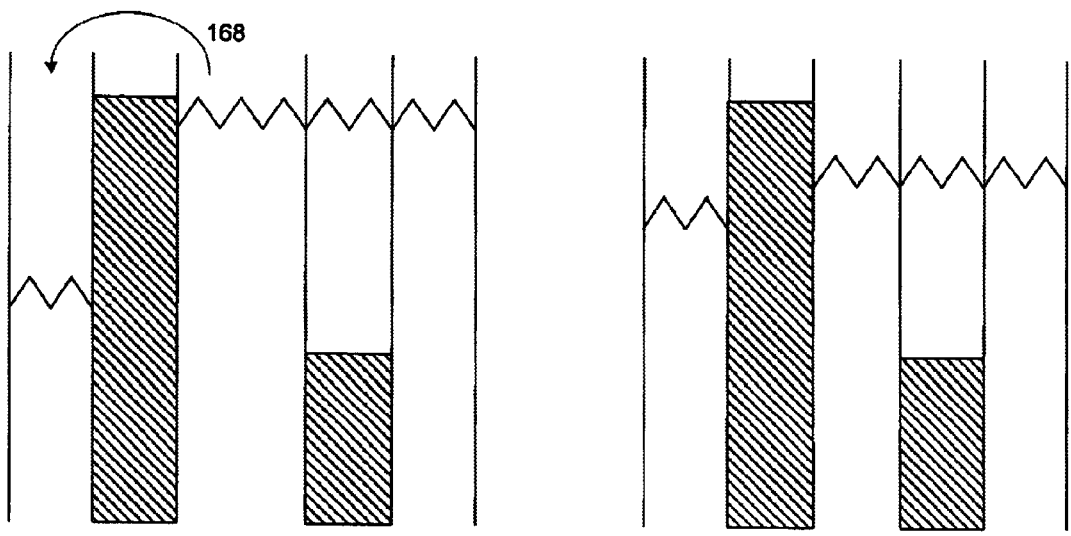

Referring now to FIG. 3G, the decreasing voltage at the cathode of the large photodiode 12 and the gate of the N-Channel MOS source-follower transistor 26 caused by the accumulating photocharge drops below the overflow barrier set by the gate voltage on the N-Channel MOS Reset transistor 18. At this point, any further charge that accumulates at the cathode of large photodiode 12 overflows into the Vref Large potential, to which the voltage at the cathode of the large photodiode 12 becomes clamped as shown by the arrow at reference numeral 168. Similarly, the small photodiode may eventually overflow into Vref Small.

Figure 3H:
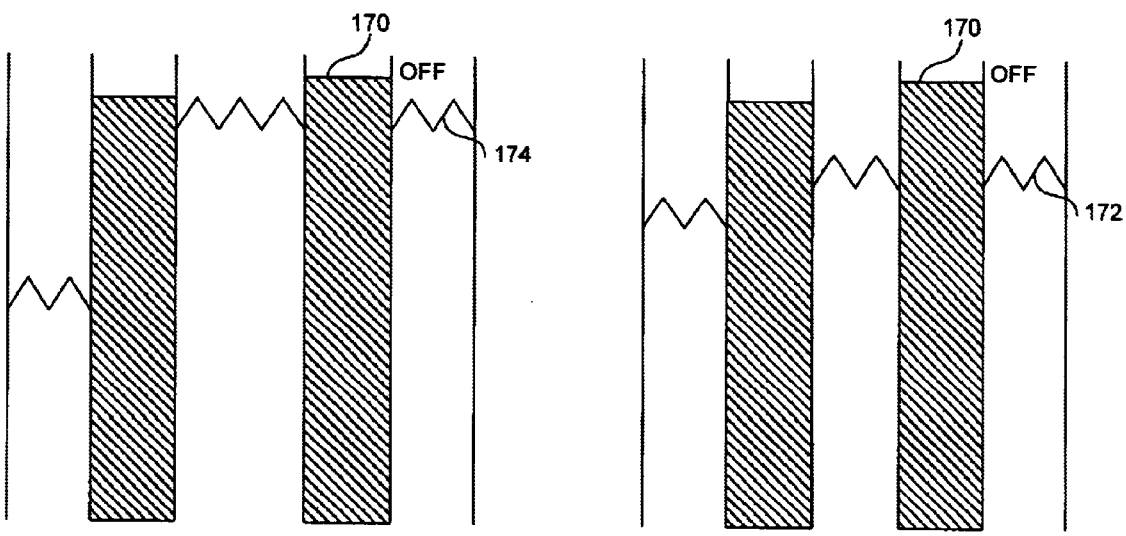

Referring now to FIG. 3H, the XFR signal is asserted low as shown at reference numeral 170, thus turning off N-Channel MOS Transfer transistors 26 and 28 of FIGS. 1A and 1B. The voltage stored at the gate of N-Channel MOS source-follower transistor 32, shown at reference numeral 172 as more positive than the voltage stored at the gate of N-Channel MOS source-follower transistor 30 (of FIGS. 1A and 1B) at reference numeral 174, controls the voltage at the common source node of N-Channel MOS source-follower transistors 30 and 32 of FIGS. 1A and 1B. The ROW SELECT signal at the gate of MOS Row-select transistor 36 of FIGS. 1A and 1B may be asserted high at any time after the XFR signal has gone low to place the output from the pixel on the column line 34. The SFD Small voltage must be brought to its high state after the transfer signal goes low, to enable output; bootstrap amplification of the signal voltage on the gate of N-Channel MOS source-follower transistor 32 will result, as disclosed in co-pending application Ser. No. 09/099,116, filed Jun. 17, 1998. During a readout phase, SFD Large and SFD Small may be held high, or as disclosed in co-pending application Ser. No. 09/099,111, filed Jun. 17, 1998, they may be pulsed high only during a brief charging interval for each row, and low otherwise.

Figure 5:
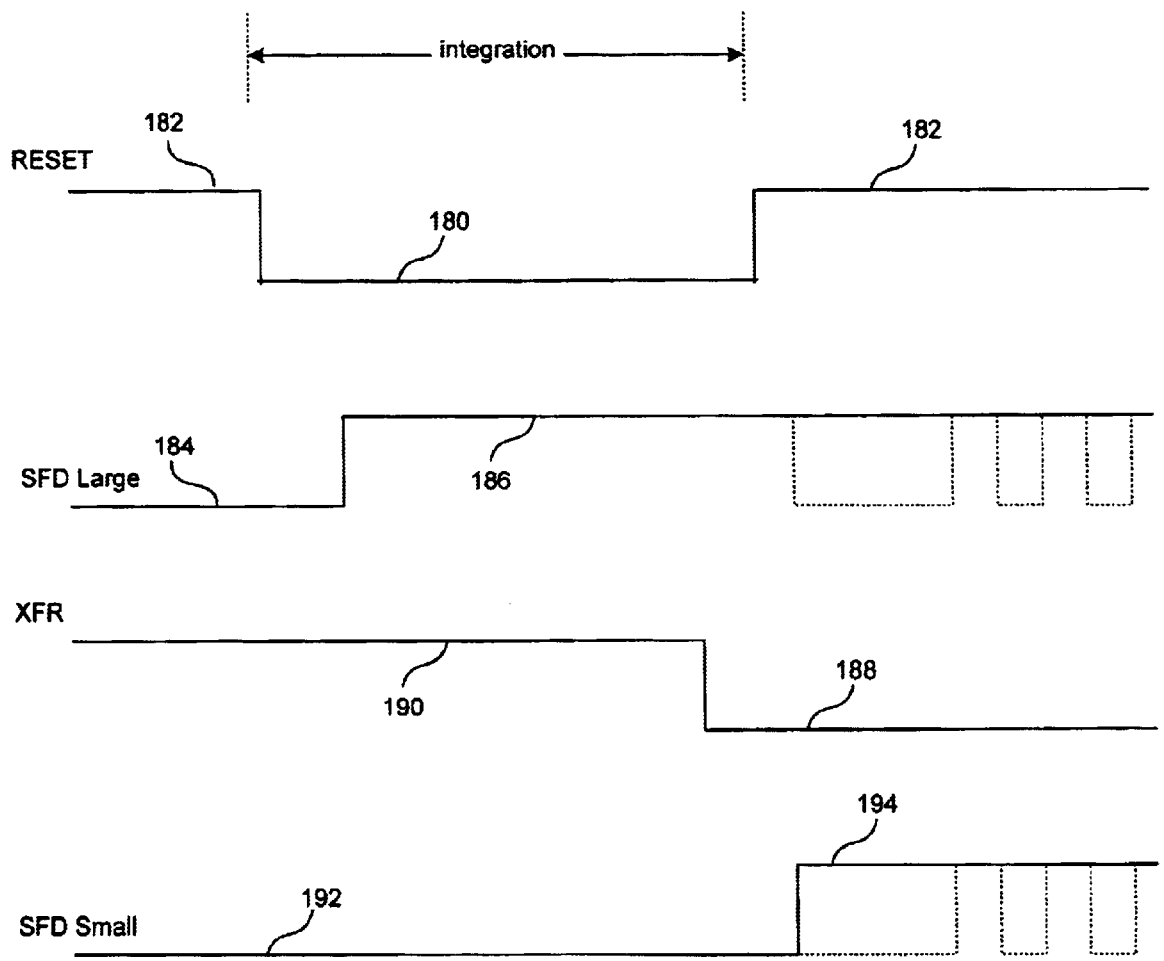
FIG. 5 is a timing diagram showing the timing and levels of the signals used to drive an array of triple-slope MOS active pixel sensors according to the present invention.

FIG. 5 is a timing diagram of voltage vs. time showing the timing and levels of the signals used to drive an array of pixel sensors according to the present invention to capture a single image in the array. Unlike the representations in the energy diagrams of FIGS. 3A through 3H, the traces of FIG. 5 are representing positive voltages, wherein higher levels represent more positive voltages.

The first trace represents the RESET signal. The inactive level of the RESET signal is shown at reference numeral 180 is set at the overflow barrier level discussed with reference to FIG. 3B. The active level of the RESET signal is shown at reference numeral 182 and is set at a level at least a threshold above Vref Large, the more positive of the two reference voltages.

The second trace of FIG. 5 represents the SFD Large signal, which, as shown, may become active during the integration period as described with reference to FIG. 3C to reset the large photodiode to barrier gate mode. The inactive level of the SFD Large signal is shown at reference numeral 184 is set at a level of 0.1 volts. The active level of the SFD Large signal is shown at reference numeral 186 and is set at a level of 3.0 volts. In an imager array that discharges the column output lines in between readout of each row, SFD Large may be pulsed as shown by the dashed lines in the second trace of FIG. 5 to supply the data from the selected row to the column lines in the array. Such an array is disclosed, for example, in co-pending application Ser. No. 09/099,111, filed Jun. 17, 1998, and expressly incorporated by reference herein.

The third trace of FIG. 5 represents the XFR signal. The inactive level of the XFR signal is shown at reference numeral 188 is set at a level of 0 volts. The active level of the XFR signal is shown at reference numeral 190 and is set at a level of 2.2 volts.

The fourth trace of FIG. 5 represents the SFD Small signal. The inactive level of the SFD Large signal is shown at reference numeral 192 is set at a level of 0.1 volts. Unlike the SFD Large signal shown in the second trace of FIG. 5, the SGFD Small signal is activated after the end of the integration period. The active level of the SFD Small signal is shown at reference numeral 194 and is set at a level of 3.0 volts. In an imager array that discharges the column output lines in between readout of each row, SFD Small may also be pulsed as shown by the dashed lines in the fourth trace of FIG. 5 to supply the data from the selected row to the column lines in the array.

In a typical application of the triple-slope MOS pixel sensor of the present invention, a plurality of such pixel sensors will be disposed in an array. As would be expected by persons of ordinary skill in the art, common RESET, XFR, Vref Large, Vref Small, SFD Large and SFD Small lines will be provided for all of the pixel sensors in the array. The source of each N-Channel MOS Row Select transistor (36 in FIGS. 1A and 36A and 36B in FIG. 1B) for each pixel sensor in a column of the array will be coupled to a column line associated with that column and the gate of the N-Channel MOS Row Select transistor (36 in FIG. 1A and 36A and 36B in FIG. 1B) for each pixel sensor in a row of the array will be coupled to a ROW SELECT line associated with that row.

Figure 6:
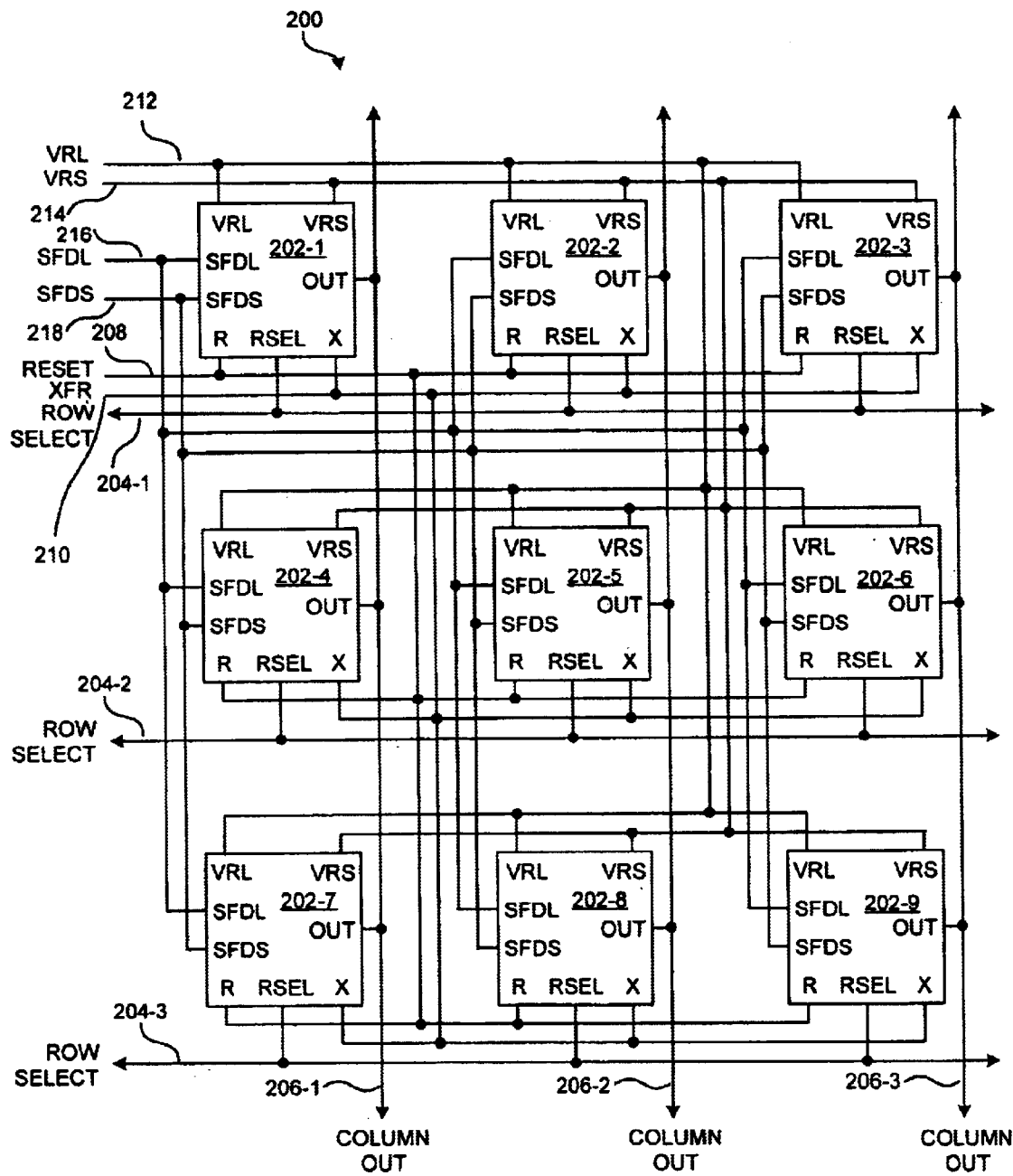
FIG. 6 is a block diagram of a 3 by 3 portion of an illustrative array of triple-slope MOS active pixel sensors according to the present invention.

Referring now to FIG. 6, a block diagram of 3 by 3 portion 200 of an illustrative array of triple-slope MOS active pixel sensors according to the present invention is presented. Persons of ordinary skill in the art will appreciate that the 3 by 3 portion of the array depicted in FIG. 6 is merely illustrative and that arrays of arbitrary size may be fabricated according to the principles of the present invention.

The 3 by 3 portion 200 of the array in FIG. 6 includes three rows and three columns of triple-slope MOS active pixel sensors according to the present invention. A first row includes triple-slope MOS active pixel sensors 202-1, 202-2, and 202-3; a second row includes triple-slope MOS active pixel sensors 202-4, 202-5, and 202-6; a third row includes triple-slope MOS active pixel sensors 202-7, 202-8, and 202-9. A first column includes triple-slope MOS active pixel sensors 202-1, 202-4, and 202-7; a second column includes triple-slope MOS active pixel sensors 202-2, 202-5, and 202-9; a third column includes triple-slope MOS active pixel sensors 202-3, 202-6, and 202-9.

A first ROW SELECT line 204-1 is connected to the row-select inputs (RSEL) of triple-slope MOS active pixel sensors 202-1, 202-2, and 202-3. A second ROW SELECT line 204-2 is connected to the row-select inputs (RSEL) of triple-slope MOS active pixel sensors 202-4, 202-5, and 202-6. A third ROW SELECT line 204-3 is connected to the row-select inputs (RSEL) of triple-slope MOS active pixel sensors 202-7, 202-8, and 202-9.

A first COLUMN OUTPUT line 206-1 is connected to the outputs (OUT) of triple-slope MOS active pixel sensors 202-1, 202-4, and 202-7. A second COLUMN OUTPUT line 206-2 is connected to the outputs (OUT) of triple-slope MOS active pixel sensors 202-2, 202-5, and 202-9. A third COLUMN OUTPUT line 206-3 is connected to the outputs (OUT) of triple-slope MOS active pixel sensors 202-3, 202-6, and 202-9.

A global RESET line 208 is connected to the reset (R) inputs of all of the triple-slope MOS active pixel sensors 202-1 through 202-9. A global XFR line 210 is connected to the transfer (X) inputs of all of the triple-slope MOS active pixel sensors 202-1 through 202-9. A global Vref Large line 212 is connected to the Vref Large (VRL) inputs of all of the triple-slope MOS active pixel sensors 202-1 through 202-9. A global Vref Small line 214 is connected to the Vref Small (VRS) inputs of all of the triple-slope MOS active pixel sensors 202-1 through 202-9. A global SFD Large line 216 is connected to the SFD Large (SDFL) inputs of all of the triple-slope MOS active pixel sensors 202-1 through 202-9. A global SFD Small line 218 is connected to the SFD Small (SFDS) inputs of all of the triple-slope MOS active pixel sensors 202-1 through 202-9.

When the array including 3 by 3 portion 200 is driven by the signals shown in FIG. 6, images may be captured. One particular application of such an array is in a digital camera.

Figure 7:
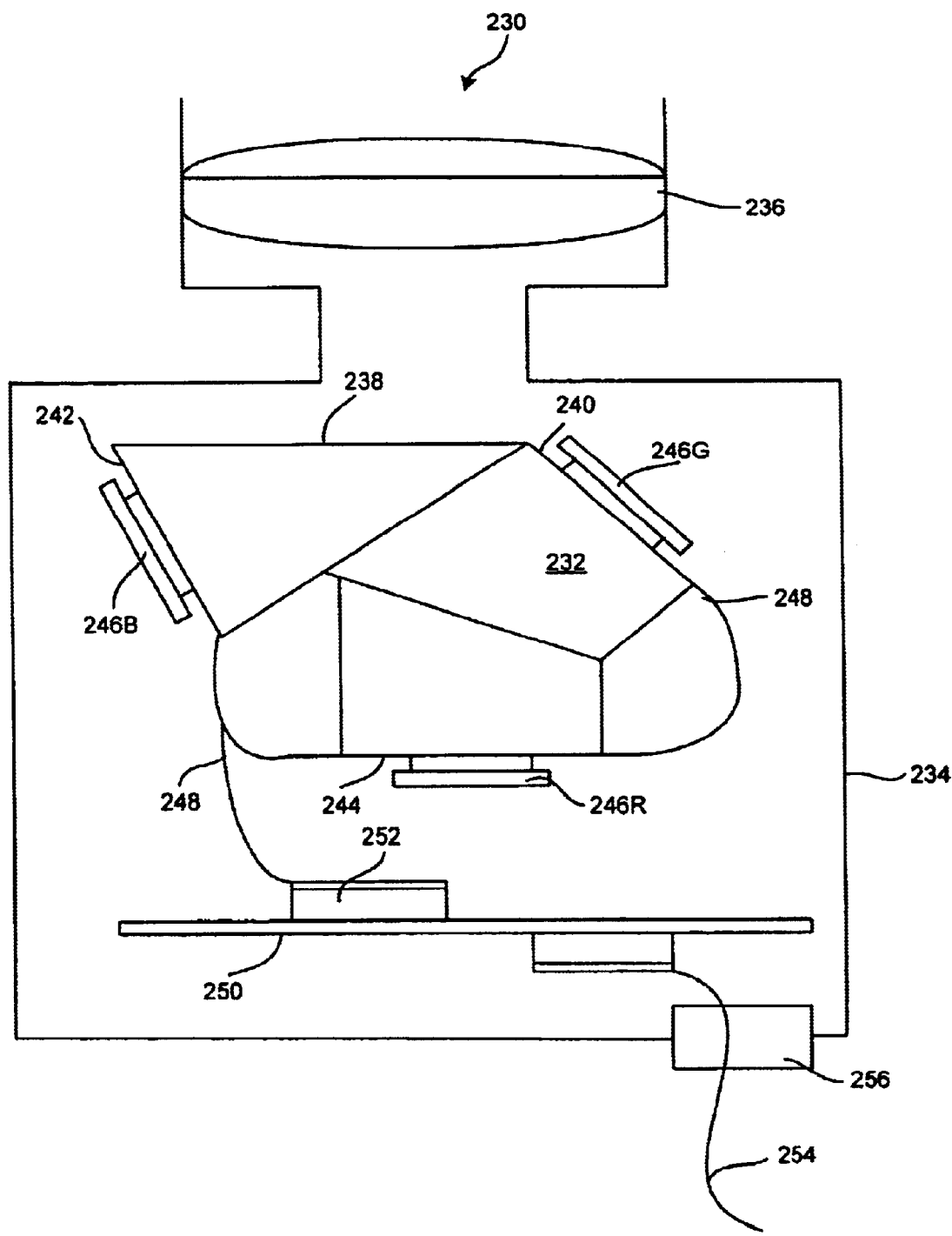
FIG. 7 is a block diagram of a digital camera according to the present invention employing three arrays of triple-slope MOS active pixel sensors.

Referring now to FIG. 7, a block diagram of an illustrative digital camera 230 employing three arrays of triple-slope MOS active pixel sensors according to the present invention is presented in schematic form. A color-separating prism 232 is shown mounted inside light-tight housing 234. Lens 236 is fitted to the housing in such a manner that it projects an image on the input face 238 of the prism 232, which is thereby split into red, green, and blue images, which are each focussed on one of output faces 240, 242, and 244 of prism 232.

Attached to the three output faces of prism 232 are three chip-on-board assemblies, labeled 246R, 246G, and 246B, aligned in such a way that the color-separated images fall on their active areas in registration. Each on-board assembly includes an imaging array of pixel sensors like that partially depicted in FIG. 6 according to the present invention. Each of these assemblies is attached to its respective prism face. One method for attaching these assemblies to the prism faces is disclosed in co-pending application Ser. No. 09/302,565, filed Apr. 30, 1999, expressly incorporated herein by reference.

Signal connections to the chip-on-board assemblies 246R, 246G, and 246B are made by way of a ribbon cable 248 which is fitted with three connectors that mate with connectors on the 3 chip-on-board assemblies. In addition, ribbon cable 248 is attached to a circuit board 250 by way of connector 252. Circuit board 250 comprises the support electronics for controlling the reading of image data from the three imaging arrays on the chip-on-board assemblies 246R, 246G, and 246B mounted on the prism 232 as is understood by those skilled in the art. Out cable 254 carries power into camera light-tight housing 234, and carries out of the camera assembly signals representative of the image entering lens 236. Cable 254 exits housing 234 through light-tight fixture 256.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An active pixel sensor disposed on a semiconductor substrate comprising:

a first capacitive storage element having a first terminal connected to a fixed potential and a second terminal;

a second capacitive storage element having a first terminal connected to a fixed potential and a second terminal;

a first photodiode having a first terminal connected to a fixed potential and a second terminal, said first photodiode having a first size;

a second photodiode having a first terminal connected to a fixed potential and a second terminal, said second photodiode having a second size smaller than said first size;

a first semiconductor reset switch having a first terminal connected to said second terminal of said first photodiode and a second terminal connected to a first reset potential that reverse biases said first photodiode;

a second semiconductor reset switch having a first terminal connected to said second terminal of said second photodiode and a second terminal connected to a second reset potential that reverse biases said second photodiode;

a first semiconductor transfer switch having a first terminal connected to said second terminal of said first photodiode and a second terminal connected to said second terminal of said first capacitive storage element;

a second semiconductor transfer switch having a first terminal connected to said second terminal of said second photodiode and a second terminal connected to said second terminal of said second capacitive storage element;

a first semiconductor source-follower amplifier having an input connected to said second terminal of said first capacitive storage element and an output;

a second semiconductor source-follower amplifier having an input connected to said second terminal of said second capacitive storage element and an output;

said first and second semiconductor reset switches and said first and second semiconductor transfer switches each having a control element connected to a control circuit for selectively activating said first and second semiconductor reset switches and said first and second semiconductor transfer switches.

2. The active pixel sensor of claim 1, wherein said outputs of said first and second semiconductor source-follower amplifiers are connected together and further including a semiconductor readout select switch coupled between the outputs of said first and second semiconductor source-follower amplifiers and a readout line, said semiconductor readout select switch having a control element coupled to said control circuit.

3. The active pixel sensor of claim 1, further including:

a readout line;

a first semiconductor readout select switch having an input connected to the output of said first semiconductor source-follower amplifier and an output coupled to said readout line;

a second semiconductor readout select switch having an input connected to the output of said second semiconductor source-follower amplifier and an output coupled to said readout line;

said first and second semiconductor readout select switches each having a control element connected to said control circuit for selectively activating said first and second semiconductor readout select switches.

4. The active pixel sensor of claim 1, wherein said control circuit includes means for setting said first transfer switch to an energy barrier level defining a breakpoint between said first and second light-to-output-voltage transfer gains.

5. A triple-slope MOS active pixel sensor disposed on a semiconductor substrate comprising:

a first photodiode having a first terminal connected to a fixed potential and a second terminal, said first photodiode having a first size;

a second photodiode having a first terminal connected to a fixed potential and a second terminal, said second photodiode having a second size smaller than said first size;

a first MOS reset transistor having a source connected to said second terminal of said first photodiode, a drain connected to a first reset potential that reverse biases said first photodiode, and a gate connected to a source of a RESET signal;

a second MOS reset transistor having a source connected to said second terminal of said second photodiode, a drain connected to a second reset potential that reverse biases said second photodiode, and a gate connected to said source of a RESET signal;

a first MOS transfer transistor having a drain connected to said second terminal of said first photodiode, a gate connected to a source of a XFR signal, and a source;

a second MOS transfer transistor having a drain connected to said second terminal of said second photodiode, a gate connected to a source of a XFR signal, and a source;

a first MOS source-follower transistor having a gate connected to said source of said first MOS transfer transistor, a drain connected to a first drain node and a source;

a second MOS source-follower transistor having a gate connected to said source of said second MOS transfer transistor, a drain connected to a second drain node and a source;

said RESET signal, said XFR signal, and said first and second drain node connected to a control circuit for selectively activating said first and second MOS reset transistors and said first and second MOS transfer transistors.

6. The active pixel sensor of claim 5, wherein said control circuit includes means for setting said first MOS transfer transistor to an energy barrier level defining a breakpoint between said first and second light-to-output-voltage transfer gains.

7. The triple-slope MOS active pixel sensor of claim 5 wherein said outputs of said first and second MOS source-follower transistors are connected together, and further including a MOS readout select transistor coupled between the sources of said first and second N-Channel MOS source-follower transistors and a readout line, said MOS readout select transistor having a gate coupled to said control circuit via a ROW SELECT line.

8. The triple-slope MOS active pixel sensor of claim 5, further including:

a readout line;

a first MOS readout select transistor having a drain connected to the source of said first MOS source-follower transistor, a source coupled to said readout line, and a gate coupled to a ROW SELECT line;

a second MOS readout select transistor having a drain connected to the source of said second MOS source-follower transistor, a source coupled to said readout line, and a gate coupled to said ROW SELECT line;

said ROW SELECT LINE connected to said control circuit for selectively activating said first and second semiconductor readout select switches.

* * * * *